March 23, 1948. E. A. STALKER 2,438,255
WING LIFT CONTROL FOR AIRCRAFT
Filed Oct. 13, 1943 3 Sheets-Sheet 2
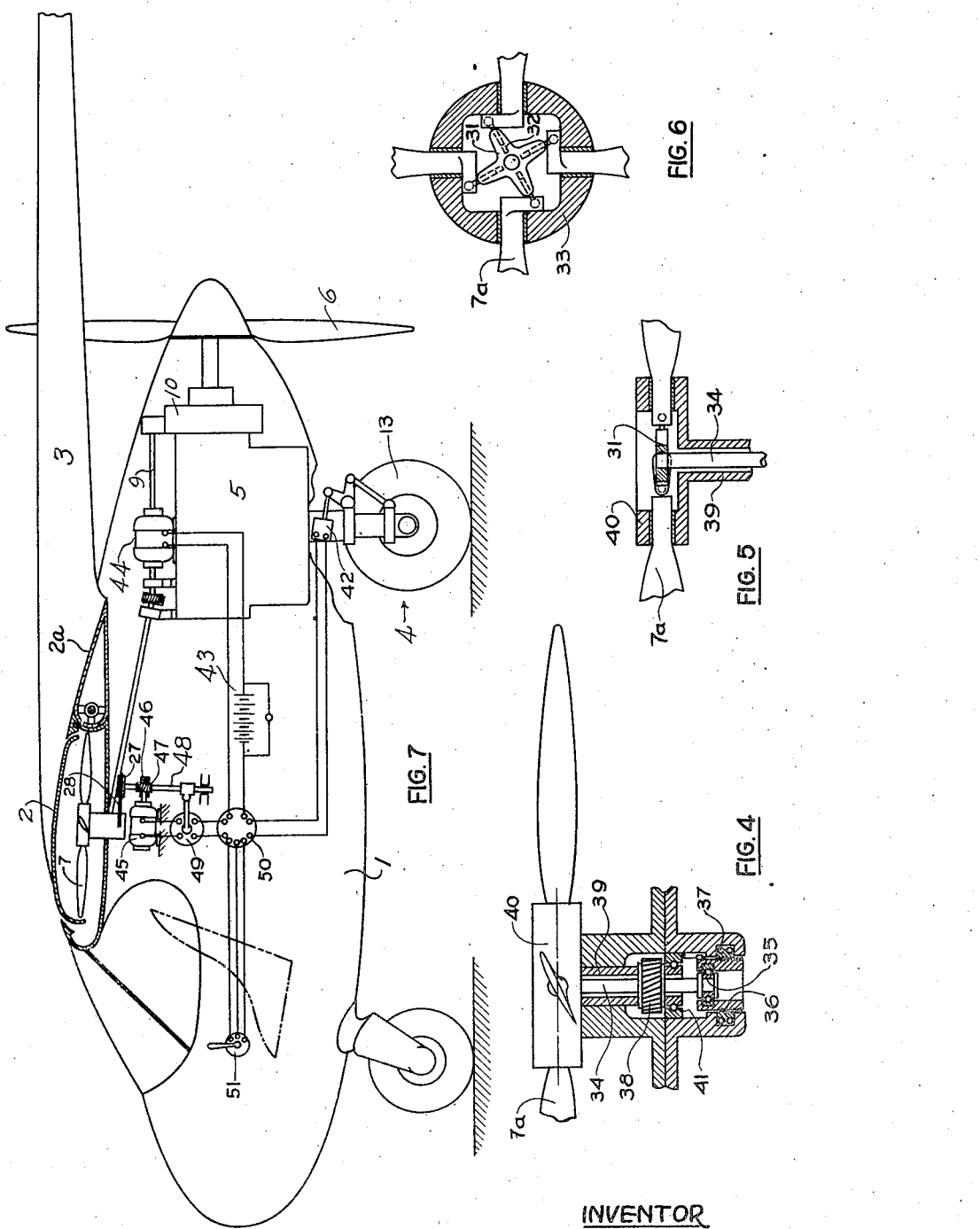
INVENTOR
Edward A. Stalker
By Marechal and Biebel
ATTORNEYS March 23, 1948.  E. A. STALKER  2,438,255
WING LIFT CONTROL FOR AIRCRAFT
Filed Oct. 13, 1943  3 Sheets-Sheet 3

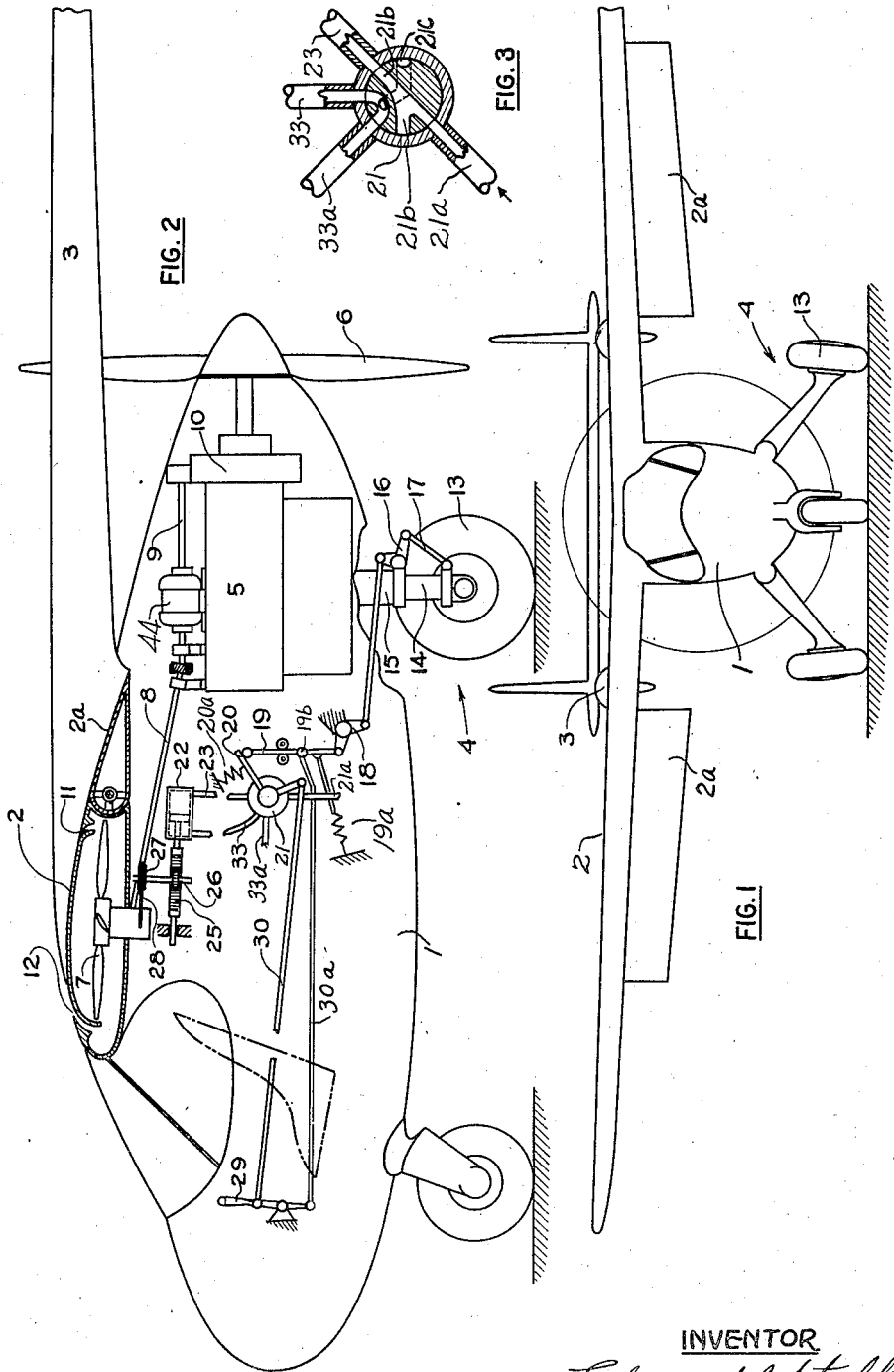

INVENTOR
Edward A. Stalker
By Marechal and Biebel
ATTORNEYS

Patented Mar. 23, 1948

2,438,255

UNITED STATES PATENT OFFICE 2,438,255

WING LIFT CONTROL FOR AIRCRAFT

Edward A. Stalker, Bay City, Mich.

Application October 13, 1943, Serial No. 506,019

4 Claims. (Cl. 244—40)

1

This invention relates to aircraft and more particularly to the control of the lift of a wing.

It is the principal object of the invention to provide an aircraft having a wing slot and a blower for inducing a flow through the slot for increasing the lift of the wing when taking off and when coming in for a landing and in which in response to the landing of the plane the slot flow is reduced or terminated to thereupon decrease the lift.

It is a further object to provide such control of the lift of the wing which takes place in response to actual flight conditions and does not require the detailed attention of the pilot but in which the pilot may exercise a supervisory control when desired.

I accomplish the objects of the invention by the means illustrated in the accompanying drawings in which—

Fig. 1 is a front elevational view of the aircraft;

Fig. 2 is a fragmentary side view of the aircraft partly in section;

Fig. 3 is a detail sectional view of a control valve;

Fig. 4 is a fragmentary side elevation of the blower partly in section;

Fig. 5 is a vertical axial section of the blower hub;

Fig. 6 is a horizontal section of the blower hub;

Fig. 7 is a side elevation of a modified form of aircraft shown partly in section;

Figures 8, 9:
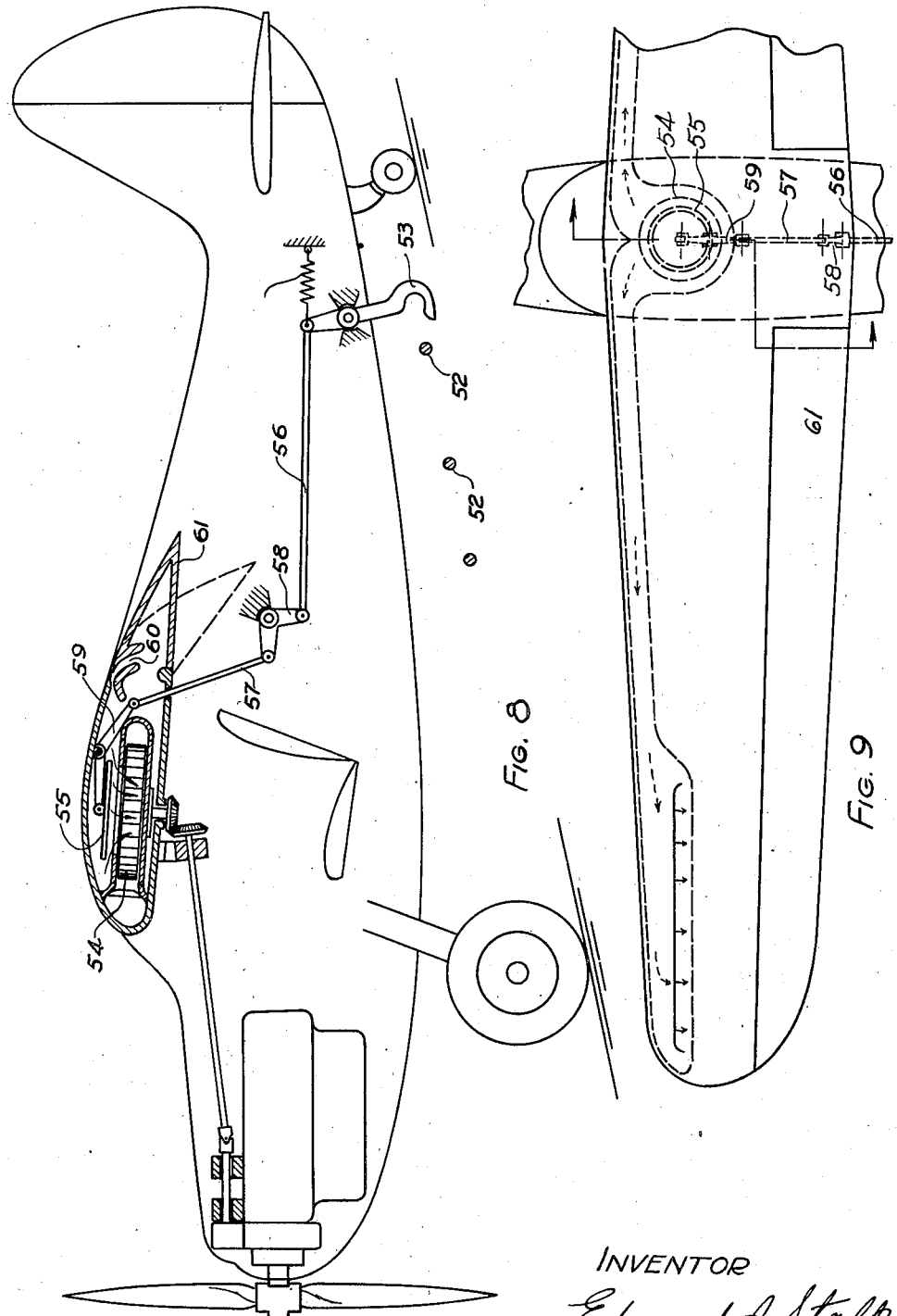
Fig. 8 is a side elevation partly in section of an aircraft adapted for arrested landings.
Fig. 9 is a fragmentary plan view of the aircraft of Fig. 8.

Even the simplest aircraft is relatively too complicated for use by persons outside a small category and if it is to have wider use its lifting capacity for landing must be increased, and if its high speed is to be sufficiently large the landing gear must be retractable.

This invention described means of relieving the operator of the aircraft of the necessity of initiating the operation of each of the lift augmenting and landing gear devices. Thus the operator is relieved of the need to remember an involved sequence of operations to be performed, and is also divested of the demand for quickness in certain emergencies, a quickness which the majority of persons would not possess or could not attain without a long training.

In Fig. 1 is shown a fuselage 1 supported in the air by the wing 2 equipped with an adjustable flap 2a. Tail booms 3 support the tail group. The machine is supported on the ground by the landing gear 4. The engine is 5 and the propeller is 6, the plane for purposes of illustration being shown as the pusher type.

In my U. S. Patent No. 1,913,644 I have shown how the lifting capacity of wings can be increased by a blower driven by the propeller operating as a windmill, an arrangement of this type being preferably utilized in the present case. The blower 7 is located within the wing 2 substantially centrally thereof and is driven by the shafts 8 and 9 operably connected to the engine 5 and the propeller 6. An automatic clutch 10 is provided between the engine and the propeller for disconnecting the engine so that the propeller can drive the blower relieved of the torque of a dead engine.

When the airplane is to be landed the flap 2a is depressed and the engine is throttled. The automatic clutch 10 then frees the engine from the propeller permitting it to act as a windmill to drive the blower 7 which inducts the boundary layer through the slot 11 in the wing located adjacent the end of the wing main body and discharges it through the slot 12 located adjacent the nose of the wing. The wing is then able to develop a high lift coefficient.

When the airplane makes contact with the ground it is desirable to destroy or materially reduce the high lift coefficient so that the weight will be transferred to the wheels. They are equipped with brakes and at low speeds are the most effective means of stopping the aircraft. The lift is reduced by interrupting the pumping action of the blower 7. This is accomplished automatically by the relative movement of the landing gear parts.

In Fig. 1 the wheel 13 moves upward upon contact with the ground so that the strut 14 moves relative to the strut 15. This relative movement actuates the bell crank 16 by means of the articulated rod 17. The movement is transferred by the bell crank 18 and rod 19 to the lever 20 of the valve 21 which directs oil under pressure from the pressure line 21a to the cylinder 22 by way of tube 23. The piston 24 within the cylinder reduces the pitch of the blower by means of the rack 25 and pinion 26 which controls the pulley 27 and belt 28. The blades 7a of the blower are supported for rotational movement and for pitch adjusting movement in the hub 33 which is driven by a hollow shaft 39, preferably integral with the hub, and rotatably supported in bearing 41. A drive gear 38 fixed to the hollow shaft meshes with a corresponding drive gear on shaft 8, to provide for rotation of the shaft 39 and the hub assembly from the engine, or from the propeller when windmilling, as described above.

Each blade 7a has a crank arm 7b which is connected by arms 32 with a spider 31. The spider is supported at the upper end of a rod 34 so that in response to axial movement of the rod, and through the ball and socket connections to the crank arms, the blades are simultaneously turned in the hub and their pitch thus adjusted.

In order to effect the vertical travel of the rod 34 it is provided at its lower end with a ball bearing 35 which is received within threaded sleeve 36 having a spline connection with the stationary mounting support to provide for axial travel thereof while restricting the same against rotation. Such axial movement is produced as a result of the rotation of nut 36, the outer periphery of which receives the belt 26. Thus in response to travel of rack 25 and pulley 27, the rod 34 is raised or lowered resulting in corresponding adjustment of the pitch of the blades during continuous rotation of the hub 33.

When the airplane is taking off, as soon as the wheel 13 leaves the ground the rod 19 is lowered and the valve lever 20 is then rotated downward under the action of spring 20a to a predetermined position, providing for the setting of the valve 21 to the position to supply pressure fluid to the piston 24 in such direction as to effect increase in the pitch of the blade. Control of the blade pitch during flight is under the control of the pilot who can actuate the valve 21 through the setting of hand lever 29 which is connected to valve 21 by means of rod 30. This lever is frictionally restrained against movement but may be reset under the action of the landing gear as above described upon landing so that the actuation of rod 19 will change the setting of valve lever 20 to control the functioning of the device in accordance with actual flight conditions.

Preferably rod 19 has a knee joint 19b in the form of a toggle which is normally kept closed by means of a spring 19a. With the toggle closed the rod 19 can exert an upward push upon a valve lever 20. In case the pilot wishes to change the setting of the valve when the rod 19 is up, he can break the toggle joint by forward movement of lever 29 which through rod 30a engages the knee joint to break the toggle, overcoming the action of spring 19a, thereby permitting manual control of valve 21.

The valve 21 as shown in Figures 2 and 3 receives oil under pressure from the tube 21a leading from a suitable source of pressure such as a pump. As shown in Figure 3 the valve is in position for the pressure to flow to tube 23 to the rear end of cylinder 22 to reduce the pitch of the blowers. The fluid from the front end of 22 escapes through tube 33 into discharge tube 33a by which it is returned to a reservoir not shown.

When the valve is readjusted to deliver pressure to tube 33 the passage 21b registers with tubes 21a and 33. Fluid at the rear end of 22 escapes through tube 23 into passage 21c and thence into tube 33a which returns the fluid to the reservoir.

In this way the effectiveness of the blower with respect to inducing a flow through the wing slot is controlled in response to the actual flight conditions, the lift effect being substantially reduced as soon as the landing is made, to facilitate the final stoppage of the aircraft. Since this action takes place without the necessity of control by the pilot, assurance is provided that the most desirable conditions will be maintained at all times as required for the particular conditions of flight.

Another form of the invention employing electrical devices is shown in Fig. 7.

The landing gear wheel 13 through rod 17 operates the switch 42 when the wheel hits the ground, closing a circuit from the battery 43 (or generator 44) to the motor 45 which turns the gears 46 and 47, the latter being fixed to the shaft 48 carrying the pulley 27 for changing the blower pitch as described above. The limit switch 49 stops the motor when the pitch has reached a preassigned value in either direction.

In addition to the switches 42 and 49 there is a master switch 50 operated by a remote control 51 located conveniently for actuation by the pilot. Thus after the limit switch has stopped the motor it can still be reversed so as to increase the pitch. The pilot accomplishes this by the remote switch control 51 acting on the master switch 50. It is also possible to locate the master switch within reach of the pilot so that he may operate it directly to increase the pitch of the blower 7.

The switch 42 is a reversing switch so that when the airplane takes off and the wheel 13 drops the switch is reversed to the position for increasing the blower pitch. Then when the wheel again makes contact with the ground, the switch is moved to the position for reducing the pitch of the blower.

Still another form of the invention is shown in Figs. 8 and 9 which shows the cables 52 of an arresting device such as is used on ship board. The hook 53 engages the cables 52 and also closes the inlet to the blower 54 which is shown as a centrifugal type with inlet at the top. The plate 55 serves to close the blower inlet in its down position which it would ocupy when the hook is moved rearward. The latter's motion is transferred to the plate 55 by the rods 56 and 57 and the bell cranks 58 and 59, spring 53a normally projecting the hook and holding the plate in its raised position.

The blower ordinarily inducts air through the slot 60 in the wing flap 61.

The blower is driven either by the engine or the propeller, preferably through an automatic clutch 62 as described above.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination in an aircraft having landing gear, a hollow wing, having a slot in the wing surface leading into the wing interior, boundary layer control means for increasing the lift of said wing including a blower in communication with the wing interior to induce a flow through said slot, readily controllable means for reducing the flow induced by said blower through said slot, and means responsive to the operation of said landing gear upon the landing of the aircraft for actuating said flow reducing means to reduce the flow through said slot.

2. In combination in an aircraft equipped with an arresting device for landing, a hollow wing having a slot in its surface leading into the wing interior, a blower within the aircraft in communication with said interior to induce a flow through said slot to augment the lift of the wing, means for readily controlling the flow induced by said blower, and means responsive to the action of said arresting device in landing for actuating said flow controlling means to reduce the flow of pumped air through said blower.

3. In combination in an aircraft equipped with landing gear, a hollow wing having a slot in its surface leading into the wing interior, a blower within the aircraft in communication with said interior to induce a flow through said slot to augment the lift of the wing, said blower having blades of adjustable pitch, means for adjusting the pitch of said blades, and means responsive to the operation of said landing gear in landing for actuating said adjustable means to effect rapid reduction of the pitch of said blades.

4. In combination in an aircraft having landing gear, a wing having a slot in its surface leading into the wing interior, means for increasing the lifting capacity of the wing including a blower for inducing a flow through said slot, means for rapidly controlling the flow induced by said blower, means responsive to the operation of said landing gear upon the landing of the aircraft for actuating said flow controlling means to rapidly reduce the flow through said slot, and means responsive to the operation of said landing gear in taking off for actuating said flow controlling means to rapidly restore the flow through said slot.

EDWARD A. STALKER.

REFERENCES CITED

The following references are of record in the file of this patent:

UNITED STATES PATENTS

| Number | Name | Date |
|---|---|---|
| 1,845,960 | Daniell | Feb. 16, 1932 |
| 1,913,644 | Stalker | June 13, 1933 |
| 1,979,298 | Trey | Nov. 6, 1934 |
| 1,995,905 | Sikorsky | Mar. 26, 1935 |
| 2,041,792 | Stalker | May 26, 1936 |
| 2,173,273 | Seversky | Sept. 19, 1939 |
| 2,272,664 | Gropler | Feb. 10, 1942 |

FOREIGN PATENTS

| Number | Country | Date |
|---|---|---|
| 452,397 | Great Britain | Aug. 17, 1936 |
| 852,753 | France | Mar. 2, 1940 |